United States Patent

Matsui

[11] 4,139,265
[45] Feb. 13, 1979

[54] MODIFIED GAUSS TYPE PHOTOGRAPHIC LENS

[75] Inventor: Sei Matsui, Chiba, Japan

[73] Assignee: Nippon Kogaku K. K., Tokyo, Japan

[21] Appl. No.: 757,144

[22] Filed: Jan. 6, 1977

[30] Foreign Application Priority Data

Jan. 16, 1976 [JP] Japan .................................. 51/3932

[51] Int. Cl.$^2$ ................................................ G02B 9/60
[52] U.S. Cl. ................................................ 350/218
[58] Field of Search ...................................... 350/218

[56] References Cited

U.S. PATENT DOCUMENTS

| 2,683,396 | 7/1954 | Klemt et al. | 350/218 |
| 3,556,643 | 1/1971 | Tibbetts et al. | 350/218 |
| 3,817,603 | 6/1974 | Takahashi | 350/218 |

Primary Examiner—Paul A. Sacher
Attorney, Agent, or Firm—Shapiro and Shapiro

[57] ABSTRACT

A modified Gauss type photographic lens system comprises, in the order from the object side, a first lens component which is a positive meniscus lens having its convex surface facing the object side, a second lens component which is a positive meniscus lens having its convex surface facing the object side, a third lens component which is a negative meniscus lens having its convex surface facing the object side, a fourth lens component which is a negative meniscus lens having its concave surface facing the object side, a fifth lens component which is a positive meniscus lens cemented to the fourth lens component and havings its convex surface facing the image side, and a sixth lens component which is a biconvex lens having its more curved surface facing the image side, the lens system satisfying certain conditions peculiar to the invention.

4 Claims, 7 Drawing Figures

COMA IN MERIDIONAL DIRECTION (--- LATERAL SPHERICAL ABERRATION)

COMA IN SAGITTAL DIRECTION

MODIFIED GAUSS TYPE PHOTOGRAPHIC LENS

BACKGROUND OF THE INVENTION

1. Field of the Invention

This invention relates to improvements in a modified Gauss type photographic lens.

2. Description of the Prior Art

The Gauss type lens and its modifications have heretofore been widely used and their performances have been considerably improved. However, in order that such lens may be used with a single lens reflex camera, the back focal distance thereof must be increased and this greatly affects the correction of the various aberrations and accordingly aggravates the performance. To make such lens, therefore, use must be made of glass materials having various refractive indices and Abbe numbers, which means higher cost of the manufacture, and this could never be said to be sufficiently satisfactory.

SUMMARY OF THE INVENTION

The present invention intends to provide a modified Gauss type photographic lens which has an aperture ratio of 1:1.8 or 1:2.0, an angle of view of the order of 46° and a back focal distance as long as 0.71f or more (f represents the total focal length) and in which the various aberrations can be corrected by using a combination of a few types of glass materials and a sufficiently satisfactory performance is provided both in terms of resolution and contrast.

To achieve such an object, the modified Gauss type photographic lens system according to the present invention comprises, in order from the object side, a first lens component which is a positive meniscus lens having its convex surface facing the object side, a second lens component which is a positive meniscus lens having its convex surface facing the object side, a third lens component which is a negative meniscus lens having its convex surface facing the object side, a fourth lens component which is a negative meniscus lens having its concave surface facing the object side, a fifth lens component which is a positive meniscus lens cemented to the fourth lens component and having its convex surface facing the image side, and a sixth lens component which is a biconvex lens having its more curved surface facing the image side, and the lens system satisfies certain conditions peculiar to the present invention which will hereinafter become fully apparent from the following detailed description thereof taken in conjunction with the accompanying drawings.

DESCRIPTION OF THE PREFERRED EMBODIMENTS

Figure 1:
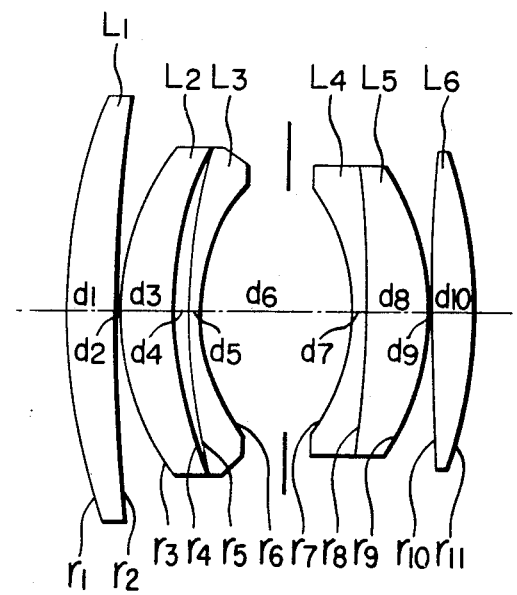
FIG. 1 is a cross-sectional view showing the construction of the lens system according to the present invention.
Figure 2:
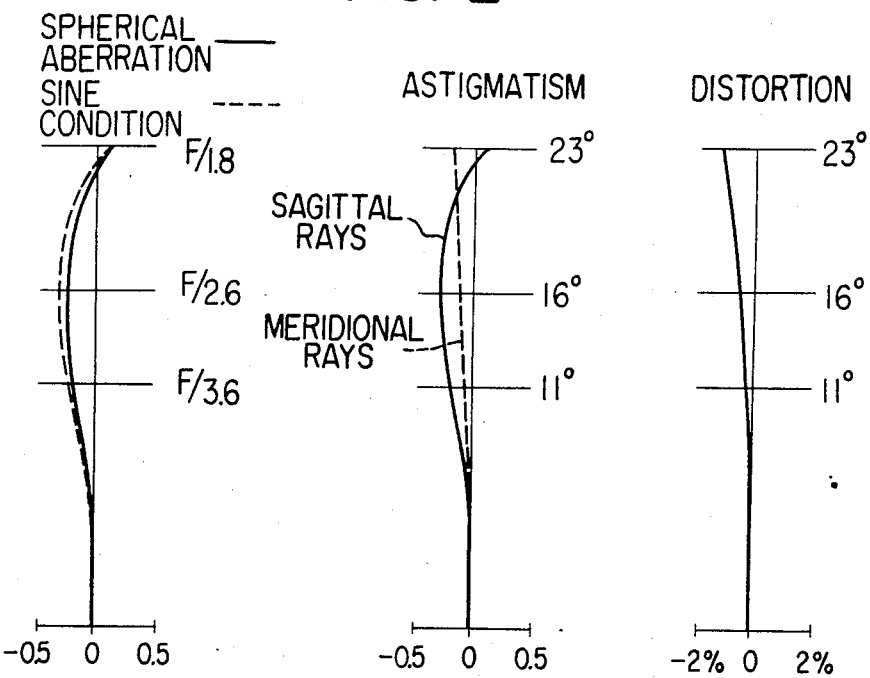
FIGS. 2, 3, 4 and 5 are graphs illustrating the corrections of the spherical aberration, sine condition, astigmatism and distortion in Examples 1, 2, 3 and 4 of the invention, respectively.
Figure 3:
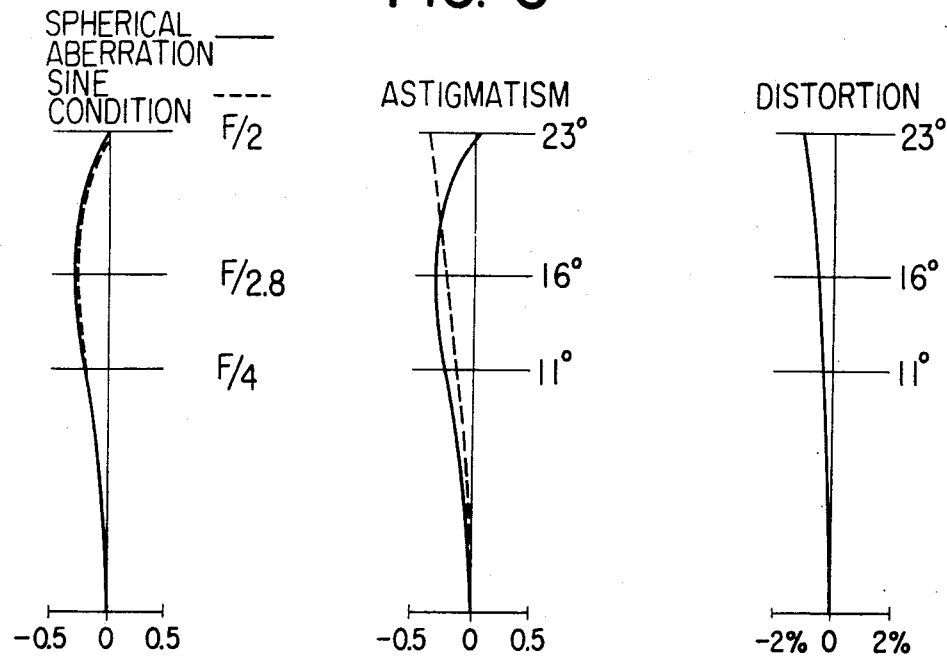
Figure 4:
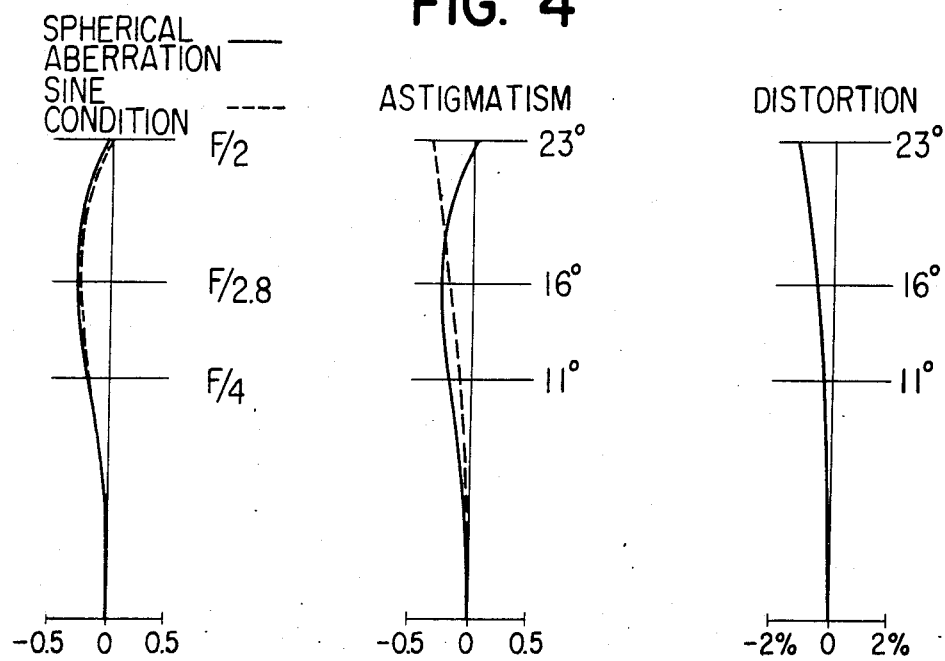
Figure 5:
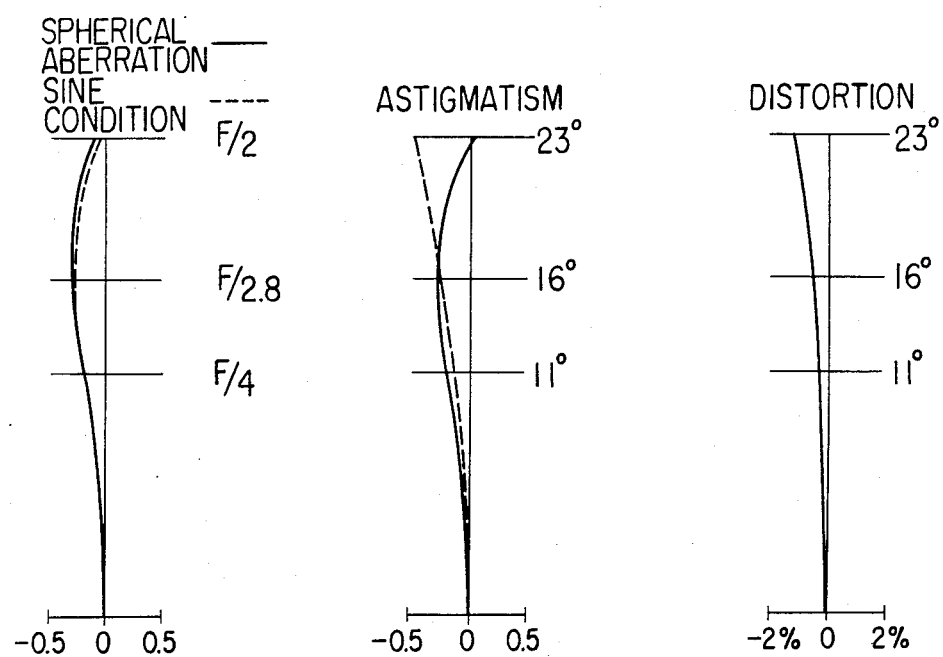

As shown in FIG. 1, the modified Gauss type photographic lens system of the present invention comprises six lens components, namely, a first L1 and a second lens component L2 both of which are positive meniscus lenses having their convex surfaces facing the object side, a third lens component L3 which is a negative meniscus lens having its convex surface facing the object side, a fourth lens L4 which is a negative meniscus lens having its concave surface facing the object side, a fifth lens component L5 which is a positive meniscus lens having its convex surface facing the image side, the fourth L4 and fifth lens components L5 being cemented together, and a sixth lens component L6 which is a biconvex lens having its more curved surface facing the image side. This lens system has a back focal distance as long as 0.71f or more and is formed of a few types of glass materials, and satisfies the following conditions:

(1) $0.7 < r_6/r_3 < 0.8$
(2) $0.7 < r_7/r_9 < 0.8$
(3) $0.95 < |r_3/r_9| < 1.05$
(4) $0.95 < |r_6/r_7| < 1.05$
(5) $0.29f < (r_6 + |r_7|)/2 < 0.32f$ $$1.7 < \frac{nd_2 + nd_3 + nd_4 + nd_5}{4} < 1.76 \quad (6)$$

$$1.80 > nd_1, nd_2, nd_5, nd_6 > 1.74 \quad (7)$$
$$50 > \nu d_1, \nu d_2, \nu d_5, \nu d_6 > 40$$

$$1.79 > nd_3, nd_4 > 1.68 \quad (8)$$
$$32 > \nu d_3, \nu d_4 > 25$$

where $r_1, r_2, \ldots, r_{11}$ are the curvature radii of the successive lens surfaces, $d_1, d_2, \ldots, d_{10}$ are the distances between adjacent ones of the lens surfaces, $nd_1, nd_2, \ldots, nd_6$ are the refractive indices of the respective glass materials, $\nu d_1, \nu d_2, \ldots, \nu d_6$ are the Abbe numbers of the respective glass materials, f is the total focal length of the entire system.

The above conditions will now be considered. Conditions (1) to (6) are intended to restrict the degrees of refraction of the meniscus lens components disposed with the diaphragm therebetween, namely, the second and third lens components and the fourth and fifth lens components. By these conditions, the back focal distance of the lens system may be made as long as 0.71f or more while, at the same time, the advantage of the intrinsic symmetry of the Gauss with respect to the diaphragm may be availed of to the utmost to thereby bring about advantages to the correction of the asymmetry of coma and chromatic difference of magnification and also reduce the Petzval sum while well correcting the coma in the sagittal direction.

More particularly, conditions (1) and (2) are intended to keep the back focal distance as long as 0.71f or more while minimizing the Petzval sum for improving the image plane characteristic. The lower limits of these conditions being exceeded would be advantageous to increase the back focal distance but would aggravate the Petzval sum and conversely, the upper limits of these conditions being exceeded would be advantageous to the Petzval sum but would make it difficult to increase the back focal distance to 0.71f or more. Conditions (3) and (4) are intended to make the two concave lens groups before and behind the diaphragm symmetrical about the diaphragm to thereby eliminate the asymmetry of the coma and provide an advantage in correcting the lateral chromatic aberration. If the upper and the lower limits of these conditions are exceeded, such symmetry will be lost so that difficulties will be encountered in correcting the coma and the chromatic difference of magnification.

Condition (5) is for well correcting the various aberrations while also well correcting the coma in the sagittal direction and, in order that this may be satisfied, condition (6) must be satisfied at the same time. More specifically, in order that the coma in the sagittal direction may be better, a greater value of $(r_6 + |r_7|)/2$ is more advantageous because $r_3$ and $r_9$ become also greater due to conditions (1) and (2), but the back focal distance becomes correspondingly shorter. Thus, conditions (5) and (6) are necessary to well correct the coma in the sagittal direction while maintaining $0.71f$ or more for the back focal distance. If the lower limit of condition (5) is exceeded, the coma in the sagittal direction could not be sufficiently corrected, and if the upper limit of condition (5) is exceeded, it will become difficult to maintain a predetermined back focal distance. If the lower limit of condition (6) is exceeded, it will become difficult to satisfy condition (5), and the upper limit of condition (6) being exceeded will be undesirable to the correction of the Petzval sum and of the chromatic aberration.

Conditions (7) and (8) are requisite for correcting the Petzval sum of the entire system and keeping the balance of the chromatic aberration in the entire system where conditions (1) to (6) are satisfied. Deviation from these conditions (7) and (8) would aggravate the image plane characteristic and in addition, destroy the balance of the chromatic aberration.

Also, as will be seen in the examples below, conditions (6), (7) and (8) are advantageous to realize the correction of the coma by using a combination of a few types of glass materials, e.g. four types of glass materials in Example 1, three types of glass materials in Examples 2 and 3, and two types of glass materials in Example 4.

Shown below are some examples of the numerical data of the modified Gauss type photographic lens according to the present invention, in which r, d, nd and νd respectively represent the curvature radius of each refracting surface, the center thickness of each lens component or the air space between adjacent lens components, the refractive index and the Abbe number of each lens component, and the subscripts represent the order from the object side.

Example 1
f = 100 mm aperture ratio 1:1,8 Angle of view 2ω = 46°

| | | | | | | | |
|---|---|---|---|---|---|---|---|
| $r_1 =$ | 79.457 | | | | | | |
| | | $d_1 =$ | 8.915 | $nd_1 = 1.79631$ | | $vd_1 = 40.8$ | |
| $r_2 =$ | 383.527 | | | | | | |
| | | $d_2 =$ | 0.194 | | | | |
| $r_3 =$ | 41.473 | | | | | | |
| | | $d_3 =$ | 9.109 | $nd_2 = 1.78797$ | | $vd_2 = 47.5$ | |
| $r_4 =$ | 63.178 | | | | | | |
| | | $d_4 =$ | 1.938 | | | | |
| $r_5 =$ | 98.837 | | | | | | |
| | | $d_5 =$ | 2.132 | $nd_3 = 1.74000$ | | $vd_3 = 28.2$ | |
| $r_6 =$ | 31.395 | | | | | | |
| | | $d_6 =$ | 25.388 | | | | |
| $r_7 =$ | −31.977 | | | | | | |
| | | $d_7 =$ | 2.519 | $nd_4 = 1.74000$ | | $vd_4 = 28.2$ | |
| $r_8 =$ | −193.798 | | | | | | |
| | | $d_8 =$ | 10.465 | $nd_5 = 1.74443$ | | $vd_5 = 49.4$ | |
| $r_9 =$ | −40.0 | | | | | | |
| | | $d_9 =$ | 0.194 | | | | |
| $r_{10} =$ | 395.930 | | | | | | |
| | | $d_{10} =$ | 6.686 | $nd_6 = 1.79631$ | | $vd_6 = 40.8$ | |
| $r_{11} =$ | −96.225 | | | | | | |

Example 1 —continued
f = 100 mm aperture ratio 1:1,8 Angle of view 2ω = 46°
back focal distance = 0.729f

Example 2
f = 100 mm, aperture ratio 1:2.0 angle of view 2ω = 46°

| | | | | | |
|---|---|---|---|---|---|
| $r_1 =$ | 75.698 | | | | |
| | | $d_1 =$ | 8.527 | $nd_1 = 1.76684$ | $vd_1 = 46.6$ |
| $r_2 =$ | 323.124 | | | | |
| | | $d_2 =$ | 0.194 | | |
| $r_3 =$ | 40.789 | | | | |
| | | $d_3 =$ | 9.690 | $nd_2 = 1.76684$ | $vd_2 = 46.6$ |
| $r_4 =$ | 60.078 | | | | |
| | | $d_4 =$ | 1.357 | | |
| $r_5 =$ | 87.486 | | | | |
| | | $d_5 =$ | 2.132 | $nd_3 = 1.69895$ | $vd_3 = 30.0$ |
| $r_6 =$ | 29.797 | | | | |
| | | $d_6 =$ | 25.969 | | |
| $r_7 =$ | −30.426 | | | | |
| | | $d_7 =$ | 1.938 | $nd_4 = 1.69895$ | $vd_4 = 30.0$ |
| $r_8 =$ | −232.558 | | | | |
| | | $d_8 =$ | 10.659 | $nd_5 = 1.74443$ | $vd_5 = 49.4$ |
| $r_9 =$ | −39.535 | | | | |
| | | $d_9 =$ | 0.194 | | |
| $r_{10} =$ | 785.659 | | | | |
| | | $d_{10} =$ | 7.171 | $nd_6 = 1.76684$ | $vd_6 = 46.6$ |
| $r_{11} =$ | −83.176 | | | | | back focal distance = 0.729f

Example 3
f = 100, aperture ratio 1:2.0 angle of view 2ω = 46°

| | | | | | |
|---|---|---|---|---|---|
| $r_1 =$ | 75.775 | | | | |
| | | $d_1 =$ | 8.721 | $nd_1 = 1.76684$ | $vd_1 = 46.6$ |
| $r_2 =$ | 323.124 | | | | |
| | | $d_2 =$ | 0.194 | | |
| $r_3 =$ | 40.789 | | | | |
| | | $d_3 =$ | 9.690 | $nd_2 = 1.76684$ | $vd_2 = 46.6$ |
| $r_4 =$ | 60.078 | | | | |
| | | $d_4 =$ | 1.357 | | |
| $r_5 =$ | 87.486 | | | | |
| | | $d_5 =$ | 2.132 | $nd_3 = 1.69895$ | $vd_3 = 30.0$ |
| $r_6 =$ | 29.652 | | | | |
| | | $d_6 =$ | 26.163 | | |
| $r_7 =$ | −30.426 | | | | |
| | | $d_7 =$ | 1.938 | $nd_4 = 1.69895$ | $vd_4 = 30.0$ |
| $r_8 =$ | −310.078 | | | | |
| | | $d_8 =$ | 10.853 | $nd_5 = 1.74443$ | $vd_5 = 49.4$ |
| $r_9 =$ | −39.535 | | | | |
| | | $d_9 =$ | 0.194 | | |
| $r_{10} =$ | 717.054 | | | | |
| | | $d_{10} =$ | 7.558 | $nd_6 = 1.76684$ | $vd_6 = 46.6$ |
| $r_{11} =$ | −83.950 | | | | | back focal distance = 0.731f

Example 4
f = 100, aperture ratio 1:2.0 angle of view 2ω = 46°

| | | | | | |
|---|---|---|---|---|---|
| $r_1 =$ | 75.700 | | | | |
| | | $d_1 =$ | 8.527 | $nd_1 = 1.76684$ | $vd_1 = 46.6$ |
| $r_2 =$ | 323.124 | | | | |
| | | $d_2 =$ | 0.194 | | |
| $r_3 =$ | 40.698 | | | | |
| | | $d_3 =$ | 9.690 | $nd_2 = 1.76684$ | $vd_2 = 46.6$ |
| $r_4 =$ | 60.078 | | | | |
| | | $d_4 =$ | 1.453 | | |
| $r_5 =$ | 87.486 | | | | |
| | | $d_5 =$ | 2.132 | $nd_3 = 1.69895$ | $vd_3 = 30.0$ |
| $r_6 =$ | 29.574 | | | | |
| | | $d_6 =$ | 25.969 | | |
| $r_7 =$ | −30.523 | | | | |
| | | $d_7 =$ | 1.938 | $nd_4 = 1.69895$ | $vd_4 = 30.0$ |
| $r_8 =$ | −968.992 | | | | |
| | | $d_8 =$ | 11.047 | $nd_5 = 1.76684$ | $vd_5 = 46.6$ |
| $r_9 =$ | −39.922 | | | | |
| | | $d_9 =$ | 0.194 | | |
| $r_{10} =$ | 678.295 | | | | |
| | | $d_{10} =$ | 7.558 | $nd_6 = 1.76684$ | $vd_6 = 46.6$ |
| $r_{11} =$ | −89.481 | | | | | back focal distance = 0.727f

The spherical aberration, sine condition, astigmatism and distortion in Examples 1, 2, 3 and 4 are graphically shown in FIGS. 2, 3, 4 and 5.

Figure 6:
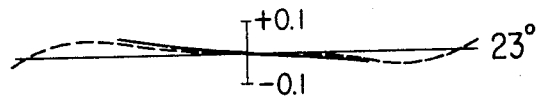
FIG. 6 illustrates the coma in the meridional direction in Example 1, with the lateral spherical aberration shown by a broken line.
Figure 6:
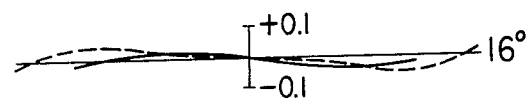
Figure 6:
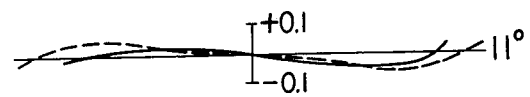
Figure 7:
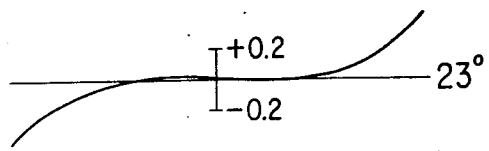
FIG. 7 is a graph illustrating the coma in the sagittal direction in Example 1.
Figure 7:
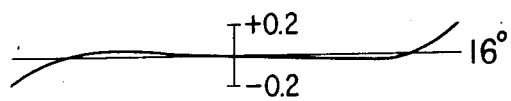
Figure 7:
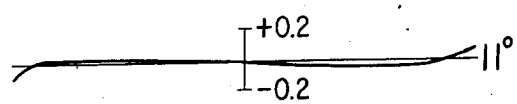

FIG. 6 illustrates the coma in the meridional direction in Example 1, with the lateral spherical aberration shown by a broken line. FIG. 7 illustrates the coma in the sagittale direction also in Example 1.

As will be seen in these graphs, the back focal distance is as long as 0.71f or more, and the number of types of glass materials is restricted to a small number, say, four in Example 1, three in Examples 2 and 3, and two in Example 4, and yet the various aberrations are well corrected and the performance is fully satisfactory both in terms of resolution and contrast.

What is claimed is:

1. A modified Gauss type photographic lens system having a back focal distance as long as 71% or more of the total focal length of the entire system comprising, in the order from the object side, a first lens component which is a positive meniscus lens having its convex surface facing the object side, a second lens component which is a positive meniscus lens having its convex surface facing the object side, a third lens component which is a negative meniscus lens having its convex surface facing the object side, a fourth lens component which is a negative meniscus lens having its concave surface facing the object side, a fifth lens component which is a positive meniscus lens cemented to said fourth lens component and having its convex surface facing the image side, and a sixth lens component which is a biconvex lens having its more curved surface facing the image side, said lens system satisfying the following conditions:

(1) $0.7 < r_6/r_3 < 0.8$
(2) $0.7 < r_7/r_9 < 0.8$
(3) $0.95 < |r_3/r_9| < 1.05$
(4) $0.95 < |r_6/r_7| < 1.05$
(5) $0.29f < (r_6 + |r_7|)/2 < 0.32f$ and wherein the numerical data are as shown in the following table:

| Radii | Thickness and air spaces | Refractive indexes | Abbe number |
|---|---|---|---|
| $r_1 = 79.457$ | | | |
| | $d_1 = 8.915$ | $nd_1 = 1.79631$ | $vd_1 = 40.8$ |
| $r_2 = 383.527$ | | | |
| | $d_2 = 0.194$ | | |
| $r_3 = 41.473$ | | | |
| | $d_3 = 9.109$ | $nd_2 = 1.78797$ | $\mu d_2 = 47.5$ |
| $r_4 = 63.178$ | | | |
| | $d_4 = 1.938$ | | |
| $r_5 = 98.837$ | | | |
| | $d_5 = 2.132$ | $nd_3 = 1.74000$ | $vd_3 = 28.2$ |
| $r_6 = 31.395$ | | | |
| | $d_6 = 25.388$ | | |
| $r_7 = -31.977$ | | | |
| | $d_7 = 2.519$ | $nd_4 = 1.74000$ | $vd_4 = 28.2$ |
| $r_8 = -193.798$ | | | |
| | $d_8 = 10.465$ | $nd_5 = 1.74443$ | $vd_5 = 49.4$ |
| $r_9 = -40.0$ | | | |
| | $d_9 = 0.194$ | | |
| $r_{10} = 395.930$ | | | |
| | $d_{10} = 6.686$ | $nd_6 = 1.79631$ | $vd_6 = 40.8$ |
| $r_{11} = -96.225$ | | | | where f is the total focal length of the entire system, r, d, nd and vd respectively represent the curvature radius of each refracting surface, the distance between adjacent refracting surfaces, the refractive index and the Abbe number of the glass forming each lens component, and the subscripts represent the order from the object side.

2. A modified Gauss type photographic lens system having a back focal distance as long as 71% or more of the total focal length of the entire system comprising, in the order from the object side, a first lens component which is a positive meniscus lens having its convex surface facing the object side, a second lens component which is a positive meniscus lens having its convex surface facing the object side, a third lens component which is a negative meniscus lens having its convex surface facing the object side, a fourth lens component which is a negative meniscus lens having its concave surface facing the object side, a fifth lens component which is a positive meniscus lens cemented to said fourth lens component and having its convex surface facing the image side, and a sixth lens component which is a biconvex lens having its more curved surface facing the image side, said lens system satisfying the following conditions:

(1) $0.7 < r_6/r_3 < 0.8$
(2) $0.7 < r_7/r_9 < 0.8$
(3) $0.95 < |r_3/r_9| < 1.05$
(4) $0.95 < |r_6/r_7| < 1.05$
(5) $0.29f < (r_6 + |r_7|)/2 < 0.32f$ and wherein the numerical data are as shown in the following table:

| Radii | Thicknesses and air spaces | Refractive indexes | Abbe number |
|---|---|---|---|
| $r_1 = 75.698$ | | | |
| | $d_1 = 8.527$ | $nd_1 = 1.76684$ | $vd_1 = 46.6$ |
| $r_2 = 323.124$ | | | |
| | $d_2 = 0.194$ | | |
| $r_3 = 40.789$ | | | |
| | $d_3 = 9.690$ | $nd_2 = 1.76684$ | $vd_2 = 46.6$ |
| $r_4 = 60.078$ | | | |
| | $d_4 = 1.357$ | | |
| $r_5 = 87.486$ | | | |
| | $d_5 = 2.132$ | $nd_3 = 1.69895$ | $vd_3 = 30.0$ |
| $r_6 = 29.797$ | | | |
| | $d_6 = 25.969$ | | |
| $r_7 = -30.426$ | | | |
| | $d_7 = 1.938$ | $nd_4 = 1.69895$ | $vd_4 = 30.0$ |
| $r_8 = -232.558$ | | | |
| | $d_8 = 10.659$ | $nd_5 = 1.74443$ | $vd_5 = 49.4$ |
| $r_9 = -39.535$ | | | |
| | $d_9 = 0.194$ | | |
| $r_{10} = 785.659$ | | | |
| | $d_{10} = 7.171$ | $nd_6 = 1.76684$ | $vd_6 = 46.6$ |
| $r_{11} = -83.176$ | | | | where f is the total focal length of the entire system, r, d, nd and vd respectively represent the curvature radius of each refracting surface, the distance between adjacent refracting surfaces, the refractive index and the Abbe number of the glass forming each lens component, and the subscripts represent the order from the object side.

3. A modified Gauss type photographic lens system having a back focal distance as long as 71% or more of the total focal length of the entire system comprising, in the order from the object side, a first lens component which is a positive meniscus lens having its convex surface facing the object side, a second lens component which is a positive meniscus lens having its convex surface facing the object side, a third lens component which is a negative meniscus lens having its convex surface facing the object side, a fourth lens component which is a negative meniscus lens having its concave surface facing the object side, a fifth lens component which is a positive meniscus lens cemented to said fourth lens component and having its convex surface facing the image side, and a sixth lens component which is a biconvex lens having its more curved surface facing the image side, said lens system satisfying the following conditions:

(1) $0.7 < r_6/r_3 < 0.8$
(2) $0.7 < r_7/r_9 < 0.8$
(3) $0.95 < |r_3/r_9| < 1.05$
(4) $0.95 < |r_6/r_7| < 1.05$
(5) $0.29f < (r_6 + |r_7|)/2 < 0.32f$ and wherein the numerical data are as shown in the following table:

| Radii | Thicknesses and air spaces | Refractive indexes | Abbe number |
|---|---|---|---|
| $r_1 = 75.775$ | | | |
| | $d_1 = 8.721$ | $nd_1 = 1.76684$ | $vd_1 = 46.6$ |
| $r_2 = 323.124$ | | | |
| | $d_2 = 0.194$ | | |
| $r_3 = 40.789$ | | | |
| | $d_3 = 9.690$ | $nd_2 = 1.76684$ | $vd_2 = 46.6$ |
| $r_4 = 60.078$ | | | |
| | $d_4 = 1.357$ | | |
| $r_5 = 87.486$ | | | |
| | $d_5 = 2.132$ | $nd_3 = 1.69895$ | $vd_3 = 30.0$ |
| $r_6 = 29.652$ | | | |
| | $d_6 = 26.163$ | | |
| $r_7 = -30.426$ | | | |
| | $d_7 = 1.938$ | $nd_4 = 1.69895$ | $vd_4 = 30.0$ |
| $r_8 = -310.078$ | | | |
| | $d_8 = 10.853$ | $nd_5 = 1.74443$ | $vd_5 = 49.4$ |
| $r_9 = -39.535$ | | | |
| | $d_9 = 0.194$ | | |
| $r_{10} = 717.054$ | | | |
| | $d_{10} = 7.558$ | $nd_6 = 1.76684$ | $vd_6 = 46.6$ |
| $r_{11} = -83.950$ | | | | where f is the total focal length of the entire system, r, d, nd and $vd$ respectively represent the curvature radius of each refracting surface, the distance between adjacent refracting surfaces, the refractive index and the Abbe number of the glass forming each lens component, and the subscripts represent the order from the object side.

4. A modified Gauss type photographic lens system having a back focal distance as long as 71% or more of the total focal length of the entire system comprising, in the order from the object side, a first lens component which is a positive meniscus lens having its convex surface facing the object side, a second lens component which is a positive meniscus lens having its convex surface facing the object side, a third lens component which is a negative meniscus lens having its convex surface facing the object side, a fourth lens component which is a negative meniscus lens having its concave surface facing the object side, a fifth lens component which is a positive meniscus lens cemented to said fourth lens component and having its convex surface facing the image side, and a sixth lens component which is a biconvex lens having its more curved surface facing the image side, said lens system satisfying the following conditions:

(1) $0.7 < r_6/r_3 < 0.8$
(2) $0.7 < r_7/r_9 < 0.8$
(3) $0.95 < |r_3/r_9| < 1.05$
(4) $0.95 < |r_6/r_7| < 1.05$
(5) $0.29f < (r_6 + |r_7|)/2 < 0.32f$ and wherein the numerical data are as shown in the following table:

| Radii | Thicknesses and air spaces | Refractive indexes | Abbe number |
|---|---|---|---|
| $r_1 = 75.700$ | | | |
| | $d_1 = 8.527$ | $nd_1 = 1.76684$ | $vd_1 = 46.6$ |
| $r_2 = 323.124$ | | | |
| | $d_2 = 0.194$ | | |
| $r_3 = 40.698$ | | | |
| | $d_3 = 9.690$ | $nd_2 = 1.76684$ | $vd_2 = 46.6$ |
| $r_4 = 60.078$ | | | |
| | $d_4 = 1.453$ | | |
| $r_5 = 87.486$ | | | |
| | $d_5 = 2.132$ | $nd_3 = 1.69895$ | $vd_3 = 30.0$ |
| $r_6 = 29.574$ | | | |
| | $d_6 = 25.969$ | | |
| $r_7 = -30.523$ | | | |
| | $d_7 = 1.938$ | $nd_4 = 1.69895$ | $vd_4 = 30.0$ |
| $r_8 = -968.922$ | | | |
| | $d_8 = 11.047$ | $nd_5 = 1.76684$ | $vd_5 = 46.6$ |
| $r_9 = -39.922$ | | | |
| | $d_9 = 0.194$ | | |
| $r_{10} = 678.295$ | | | |
| | $d_{10} = 7.558$ | $nd_6 = 1.76684$ | $vd_6 = 46.6$ |
| $r_{11} = -89.481$ | | | | where f is the total focal length of the entire system, r, d, nd and $vd$ respectively represent the curvature radius of each refracting surface, the distance between adjacent refracting surfaces, the refractive index and the Abbe number of the glass forming each lens component, and the subscripts represent the order from the object side.

* * * * *

UNITED STATES PATENT AND TRADEMARK OFFICE
CERTIFICATE OF CORRECTION

PATENT NO. : 4,139,265
DATED : February 13, 1979
INVENTOR(S) : Sei Matsui

It is certified that error appears in the above-identified patent and that said Letters Patent are hereby corrected as shown below:

Column 2, line 25; column 5, line 38; column 6, line 21; column 7, line 7; and column 8, line 14, "$0.29f < (r_6 + |r_7|/2 < 0.32f$" should read --$0.29f < (r_6 + |r_7|)/2 < 0.32f$--; and Column 3, line 12, "$(r_6 + |r_7|/2$" should read --$(r_6 + |r_7|)/2$--.

Signed and Sealed this

Twenty-fifth Day of September 1979

[SEAL]

Attest:

Attesting Officer

LUTRELLE F. PARKER
*Acting Commissioner of Patents and Trademarks*